United States Patent Office 3,359,120
Patented Dec. 19, 1967

3,359,120
METHOD OF TREATING A MEAT EMULSION TO PRODUCE A DESIRED COLOR THEREIN
Jerome A. Meusel and Ralph A. Brunn, Baltimore, Md., assignors to The Baltimore Spice Company, Baltimore, Md., a corporation of Maryland
No Drawing. Filed Jan. 22, 1965, Ser. No. 427,465
3 Claims. (Cl. 99—109)

ABSTRACT OF THE DISCLOSURE

A dry composition consisting of a normally solid, edible acid, such as fumaric acid, encapsulated in a solid coating to which the acid is inert, so that the acid can be incorporated into emulsions of meat products without reacting with the emulsion while the sausage or similar product is in the chopper, but which makes it possible for the acid to be released into the meat being processed when the meat is heated sufficiently to melt the coating, e.g. in the smokehouse, releasing the acid when it is effective to impart a desired color to the meat product.

---

This invention relates to the deferred release of an acid in meat products. More particularly, it relates to a dry composition containing an edible acid, the preparation of such a composition and to its use in the coloring of meat emulsions.

It is already known that a stable and attractive color may be developed in meat products prepared from meat emulsions, by suitably controlling the pH of the materials being processed so that emulsification is effected at a pH between 6.0 and 6.2 and color development is achieved at a pH between 5.5 and 5.8.

A principal object of this invention is to provide an edible acid or mixtures of edible acids in a form which permits incorporation of same in meats prior to or during emulsification, without adversely affecting the quality of the resulting emulsion.

Another object of the invention is to provide an edible acid or mixtures of edible acids in a form which may be readily stored without spoilage.

Still another object of the invention is to provide an edible acid or mixture of edible acids to meat in process, for the purpose of enhancing the color and color stability of a meat emulsion containing such acid or acids.

A further object of the invention is to improve the color of meat emulsions containing seasonings such as are commonly used in sausage and other encased meat products without adversely affecting the flavor of the seasonings in said products.

These and other objects of the invention will become apparent from the description which follows in which preferred embodiments of the invention have been set forth.

Briefly the edible acid or mixture of edible acids, such as fumaric acid is coated with a substantially continuous film of a non-toxic, bland, water-tight coating material which melts at a temperature encountered in the subsequent processing of a meat emulsion, whereby the coating will become discontinuous and the edible acid or acids will be free to penetrate into the meat emulsion and accelerate the development of color, e.g. during the heating cycle in the smokehouse.

Materials which have been used to coat the fumaric acid listed above include

Paraffin wax
Beeswax
Hydrogenated vegetable oils
Hydrogenated lard
Various acetylated monoglycerides
Vegetable waxes
Other natural waxes
Synthetic waxes Each of the above must of course be edible and non-toxic and must be tasteless or bland and free of any marked taste of their own. They must also be chemically inert to the fumaric acid and should melt at temperatures of about 100° F. to 180° F. and it will be apparent that other materials possessing the desired combination of properties will suggest themselves to others skilled in the art.

The relative proportions of fumaric acid to coating material must be such that a substantially continuous coating is provided around each acid particle and to some extent this will depend on the specific procedure selected for applying the coating to the acid.

Several processes were found to give suitable coatings. In one method, 15% of a finely divided fumaric acid was mixed with melted paraffin wax having a melting point of 127° F. This suspension was stirred until solid, using a type of mixer sufficiently forceful that the solidifying mass would be broken up into coarse lumps. These lumps would be cooled by a forced draft of cold air to about 50° F., mixed with an anti-caking agent such as tricalcium phosphate and conveniently ground to a very fine powder.

In a better method almost 100% of the acid was found to be completely encased in the wax material, the product being in a very uniform and fine particle size in the neighborhood of from 150 to 250 microns. Although this particular size turned out to be most desirable for the examples below, the particle size can be varied at will. The second method consisted of mixing 15% of fumaric acid with melted paraffin wax having a melting point of 127° F., placing the mixture into an atomizer and spraying the mixture into air with a temperature below 90° F. The atomized particles solidified almost immediately and a microscopic examination of them showed them to be spherical in shape, uniform in size, and the acid 100% coated with a few crystals of fumaric acid near the surface of the sphere, but still completely covered with wax.

In order to test the continuity and efficiency of the coating, one gram of the coated fumaric acid was suspended in water at a temperature of 70° F. and continuously stirred for 10 minutes. The solution was then titrated with standard sodium hydroxide which indicated 1.2% free fumaric acid. The suspension was heated to above the melting point of the wax, the solution titrated and 13.8% additional fumaric acid was found.

This indicated that an acid material could be made that had very little effect on the pH of the sausage emulsion at normal chopping, handling, and stuffing temperatures, but which would release acid at any selected smokehouse temperature of the meat product by using a wax or similar material which would melt at the desired temperature.

To demonstrate the usefulness of the coated acid in meat products such as frankfurters, 10 pounds of an emulsion from a commercial packer was obtained. The emulsion was normal in all respects and contained the usual amount of salt, seasoning and cure. It was divided into five 2 pound lots and the following materials added, each combination selected to give a faster than normal color development which takes from 1½ to 2 hours in usual smokehouse temperatures:

| Sample Number | Additive | Lbs. per 1 lb. of emulsion | Oz. per 100 lb. emulsion |
|---|---|---|---|
| 1 | Delta glucono lactone | .0044 | 7 |
|   | Sodium erythorbate | .0066 | 1 |
| 2 | Dextrose | .0044 | 7 |
|   | Erythorbic acid | .0006 | 1 |
| 3 | ...do... | .0006 | 1 |
|   | Fumaric acid* | .0010 | ¼ |
|   | Dextrose | .0034 | 5.4 |
| 4 | Erythorbic acid | .0006 | 1 |
|   | Fumaric acid* | .0040 | 1 |
|   | Dextrose | .004 | 0.6 |
| 5 | Erytorbic acid | .0006 | 1 |
|   | Fumaric acid* | .0080 | 1.9 |

*15% Fumaric acid plus 85% wax (M.P. 127° F.).

The product was then stuffed into cellophane casings, held in a 45° F. refrigerator until all samples were uniform in temperature and then hung in a smokehouse at 95% minimum humidity and heated according to the following schedule:

| Elapsed Time in Minutes | Sample Numbers | | | | | Smokehouse Temp., °F. | Internal Temperature of Frankfurters, °F. |
|---|---|---|---|---|---|---|---|
| | 1 | 2 | 3 | 4 | 5 | | |
| 0 | | | | | | 212 | |
| 5 | | | | | | 218 | |
| 10 | A | | | | | 220 | |
| 15 | C | | | | | 226 | |
| 20 | D | | | A | B | | 115 |
| 25 | D | A | A | D | D | | 118 |
| 30 | D | D | B | D | E | 228 | 122 |
| 35 | D | D | D | E | E | 235 | 136 |
| 40 | D | E | E | E | E | 235 | 140 |
| 45 | D | E | E | E | E | 240 | 142 |
| 50 | D | E | E | E | E | 250 | 145 |
| 55 | D | E | E | E | E | 250 | 150 |

Degree of Redness:
 A. Some evidence
 B. Noticeable
 C. Pronounced
 D. Fully Developed
 E. Fully Developed and Deep Red It was evident that at the end of twenty minutes smokehouse time, Sample No. 1 had attained maximum color developed, although the color was an unnatural pinkish cast not commonly associated with a good commercial color. The reason is unknown and immaterial in this case. The internal temperature was only 115° F. which is far below permissible temperature for smoked meat products. A higher internal temperature could have been attained with elevated smokehouse temperatures.

Sample No. 2 began to develop color at 25 minutes and rapidly developed to 30 minutes taking on a fully developed deep red color at 40 minutes.

Samples Nos. 3, 4 and 5 showed initial color development as soon as 20 minutes and reached a fully developed red color as soon as 35 minutes.

An internal temperature of 150° F. was not reached until 55 minutes had elapsed, although higher smokehouse temperatures and especially smaller diameter cellophane casings would have permitted a faster increase.

The frankfurters were removed from the smokehouse at the end of 55 minutes, cooled to 110° F. in water and then evaluated for their color, texture and flavor.

In all cases the texture was quite satisfactory with no evidence of "shorting," excessive moisture, fat or liquid pockets. Peelability, an important factor in the manufacture of skinless frankfurters, was the same in all cases.

A panel judging the surface and internal color agreed all were normal except No. 1 which was noticeably more pale.

A taste panel agreed that Samples Nos. 3, 4 and 5 were quite similar to No. 2 and in some cases were preferred over No. 2 on account of an agreeable character in flavor which some described as "tang."

Sample No. 1 was completely unacceptable when compared with No. 2, being definitely flat in flavor, especially in onion character and because of a peculiar undesirable after-taste.

It will be seen that there has been described a way to coat any of the non-liquid edible acids with a continuous film of a non-toxic substance which has a melting point above that at which meat protein is set up, thereby permitting the coated acid to be added to the meat being processed and to go through the emulsification process intact, having very little, if any, effect on the pH of the emulsion. However, after the emulsion has been stuffed into casings and put into a smokehouse, as soon as the temperature of the product reaches the melting point of the coating material, the acid is released to accelerate the color development and to stabilize or fix the color of the meat product.

Suitable amounts of the coated acid particles to be incorporated in the meat emulsion comprise between about 1% and 25% of the total composition by weight.

Particularly good results have been obtained when the coating has a melting point of approximately 120° F.

It will be seen that the present invention provides a material which is particularly useful in the processing of foods in which an acid is required to be available at some stage in the processing thereof, especially after the foods have been heated to a temperature at which the coating on the acid becomes liquid and the acid is therefore released into the foods.

We claim:
1. A method of treating a meat emulsion to produce a desired color therein which comprises incorporating in said emulsion a suitable amount of solid particles of fumaric acid, said particles being substantially completely encased in a non-toxic coating material which melts at a temperature between 100° F. and 180° F. and which is below the temperature at which the fumaric acid is to be made available to the meat emulsion, the fumaric acid constituting between 1% and 25% of the total weight of said coated particles, and thereafter smoking the meat emulsion at a temperature sufficient to melt the coating on said particles, to thereby release the acid into said meat emulsion and to produce the desired color in the resulting product.

2. The method of claim 1 in which the meat is a sausage.

3. The method of claim 1 wherein the non-toxic coating material is paraffin wax and the meat emulsion being processed is frankfurter or sausage, and the processing includes subjecting the emulsion to temperatures in the range of about 212 to 250° F.

References Cited

UNITED STATES PATENTS

| | | | |
|---|---|---|---|
| 980,936 | 1/1911 | Federer | 99—95 |
| 1,264,592 | 4/1918 | Atkinson | 99—95 |
| 1,286,904 | 12/1918 | Atkinson | 99—95 |
| 2,132,436 | 10/1938 | Reynolds et al. | 99—94 |
| 2,997,394 | 8/1961 | Melnick et al. | 99—91 X |
| 3,052,560 | 9/1962 | Delaney | 99—222 |
| 3,245,808 | 4/1966 | Farkas et al. | 99—222 |

HYMAN LORD, *Primary Examiner.*

JOSEPH M. GOLIAN, *Examiner.*